US011862043B1

(12) United States Patent
Jin

(10) Patent No.: US 11,862,043 B1
(45) Date of Patent: Jan. 2, 2024

(54) LETTER AND NUMBER-SHAPED DECORATIVE PANEL

(71) Applicant: Linghua Jin, Zhejiang (CN)

(72) Inventor: Linghua Jin, Zhejiang (CN)

( * ) Notice: Subject to any disclaimer, the term of this patent is extended or adjusted under 35 U.S.C. 154(b) by 0 days.

(21) Appl. No.: 18/324,934

(22) Filed: May 26, 2023

(30) Foreign Application Priority Data

May 10, 2023 (CN) ......................... 202321120001.0

(51) Int. Cl.
*G09F 13/04* (2006.01)

(52) U.S. Cl.
CPC ................................ *G09F 13/0413* (2013.01)

(58) Field of Classification Search
CPC .......................... G09F 13/0413; G09F 13/0404
See application file for complete search history.

(56) References Cited

U.S. PATENT DOCUMENTS 848,288 A * 3/1907 Christensen ........ G09F 13/0404 40/552
3,675,355 A * 7/1972 Shanok ............... G09F 13/0404 428/162
4,365,455 A 12/1982 Braine
4,953,314 A * 9/1990 Moulton ............. G09F 13/0404 40/545
5,151,078 A 9/1992 Lin
5,631,673 A * 5/1997 Yamamoto ........... H05K 5/0017 361/679.08
6,042,248 A * 3/2000 Hannah ............... G09F 13/0404 362/249.14
9,289,695 B2 3/2016 Sadri et al.
10,272,322 B2 4/2019 Kim
11,079,083 B1 8/2021 Yang
2003/0182833 A1* 10/2003 Lewis ................. G09F 13/0404 40/574
2005/0231943 A1* 10/2005 Sloan ...................... G09F 13/22 362/225
2018/0050381 A1* 2/2018 Lim ...................... B21D 35/001
2018/0182265 A1* 6/2018 Lim .................... G09F 13/0404
2019/0160512 A1* 5/2019 Lim ........................ B29C 53/40
2022/0211015 A1* 7/2022 Nail ..................... A01K 63/006

* cited by examiner

*Primary Examiner* — Gary C Hoge

(57) ABSTRACT

Disclosed in the present invention is a letter and number-shaped decorative panel, composed of two parts, a base plate and a side plate, the base plate is arranged in a shape of a letter or a number, a plurality of first slots are arranged at intervals along a periphery of an edge of the shape of the base plate on the base plate, the side plate is perpendicularly provided along the periphery of the edge of the shape of the base plate, and first insertion plates corresponding to the first slots are provided at a side of the side plate close to the base plate. In this case, by means of the assembly between the side plate and the base plate, the assembly can be completed by directly inserting the first insertion plates on the side plate into the corresponding first slots on the base plate correspondingly, which is simple and quick; furthermore, the first slots and the first insertion plates are directly machined when the base plate and the side plate are manufactured, which can ensure consistency after the assembly of the decorative panel and ensure stable quality. The decorative panel has the advantages of a simple structure, a reasonable design, convenience in assembly, etc.

9 Claims, 9 Drawing Sheets

LETTER AND NUMBER-SHAPED DECORATIVE PANEL

FIELD OF TECHNOLOGY

The present invention relates to the technical field of decorative articles, and in particular to a letter and number-shaped decorative panel.

BACKGROUND

In the decorative industry, letters and number-shaped decorative panels are used for decoration in popular fashion, i.e., the decorative panels are designed to be in the form of letters or numbers, and light bulbs are mounted thereon to achieve the effect of identification or decoration. If a character or number-shaped panel is simply cut, and a light bulb is mounted on the panel, the light of the light bulb diffuses to the outside of the panel, resulting in poor display effects of the letter or figure. Therefore, it is necessary to set side plates around the panel to block the light of the light bulb, limited to the area of a letter or number type panel, so as to enhance the display effect.

At present, the letter or number type panel and side plate in the letter and number-shaped decorative panel are all made of four-side-flat plates. When assembling, it is necessary to spread the letter or number type panel flat, align the side plate along a periphery of an edge of the panel shape, and then inject glue along the seam between the panel and side plate, so that the assembly is difficult and slow, but the quality assembled by different assembly personnel also varies.

Therefore, whether the structural improvement of decorative panels can solve the above problems has become an urgent issue for people to solve.

SUMMARY

In view of this, the present invention provides a letter and number-shaped decorative panel to solve the problems of high assembly difficulty, slow speed and uneven assembly quality existing in conventional letter and number-shaped decorative panels.

The technical solution provided by the present invention specifically is a letter and number-shaped decorative panel. The decorative panel comprises: a base plate and a side plate;

- wherein the base plate is in a shape of a letter and a number, and a plurality of first slots are arranged at intervals along a periphery of an edge of the shape of the base plate on the base plate;
- the side plate is perpendicularly provided along a periphery of an edge of the shape of the base plate; first insertion plates in one-to-one correspondence with the first slots in the base plate are provided at a side of the side plate close to the base plate; and the first insertion plates are inserted into the corresponding first slots to connect the side plate to the base plate, so as to form a letter and number-shaped decorative cover having an opening on one side.

Preferably, the base plate comprises a hollow-out base plate and a non-hollow-out base plate according to different shapes of the letter and the number;

- when the base plate is a hollowed-out base plate, the number of the side plates is one more than the number of holes in the base plate; and

- when the base plate is a non-hollowed-out base plate, only one side plate is provided.

Further preferably, the side plate is of an integral type.

Further preferably, the side plate is of a split type and comprises a plurality of side plate units and a plurality of connection plates; the plurality of side plate units are connected head to end in sequence, the first insertion plates correspondingly fitted with the first slots in the base plate are provided at one side of each of the side plate units close to the base plate, and second slots are provided at two ends of each of the side plate units; the connection plates are provided at a head-to-tail connection of two adjacent side plate units, second insertion plates fitting with the second slots is provided at two ends of a side wall of each of the connection plates, the second insertion plates at two ends of each of the connection plates are respectively inserted in the second slots of the two adjacent side plate units to connect the two adjacent side plate units.

Further preferably, two second slots are provided at intervals along a height direction at an end of each of the side plate units, and the two adjacent side plate units are connected by means of two connection plates.

Further preferably, decorative light bulb mounting holes are provided at intervals on the base plate.

Further preferably, the letter and number-shaped decorative panel further comprises support plates, wherein third slots are provided at a lower portion of the base plate; third insertion plates fitted with the third slots are provided at the end of each of the support plates, and the third insertion plates are inserted into the correspondingly fitted third slots to connect each of the support plates and the base plate.

Further preferably, two support plates are provided; two third slots are arranged at intervals in the transverse direction at the lower portion of the base plate; the support plates are in one-to-one correspondence with the third slots, and the third insertion plates on each of the support plates are inserted into the correspondingly fitted third slots.

Further preferably, the first slots, the second slots and the third slots are long holes.

The letter and number-shaped decorative panel provided in the present invention is composed of two parts, a base plate and a side plate, wherein the base plate is arranged according to the shape of the letter or the number, a plurality of first slots are arranged at intervals along a periphery of an edge of the shape of the base plate on the base plate, the side plate is perpendicularly provided along the periphery of the edge of the shape of the base plate, and first insertion plates corresponding to the first slots are provided at a side of the side plate close to the base plate. In this case, by means of the assembly between the side plate and the base plate, the assembly can be completed by directly inserting the first insertion plates on the side plate into the corresponding first slots on the base plate correspondingly, which is simple and quick; furthermore, the first slots and the first insertion plates are directly machined when the base plate and the side plate are manufactured, which can ensure consistency after the assembly of the decorative panel and ensure stable quality.

The letter and number-shaped decorative panel provided in the present invention has the advantages of simple structure, reasonable design, convenient assembly and disassembly, and being recyclable.

It is to be understood that both the foregoing general description and the following detailed description are exemplary and explanatory only and do not limit the disclosure of the present invention.

BRIEF DESCRIPTION OF THE DRAWINGS

The accompanying drawings, which are incorporated in and constitute a part of this specification, illustrate embodiments consistent with the invention and together with the description, serve to explain the principles of the present invention.

To describe the technical solutions in the embodiments of the present invention or in the prior art more clearly, the following briefly introduces the accompanying drawings required for describing the embodiments or the prior art. Apparently, persons of ordinary skill in the art may still derive other drawings from these accompanying drawings without creative efforts.

DETAILED DESCRIPTION OF THE EMBODIMENTS

Figure 1:
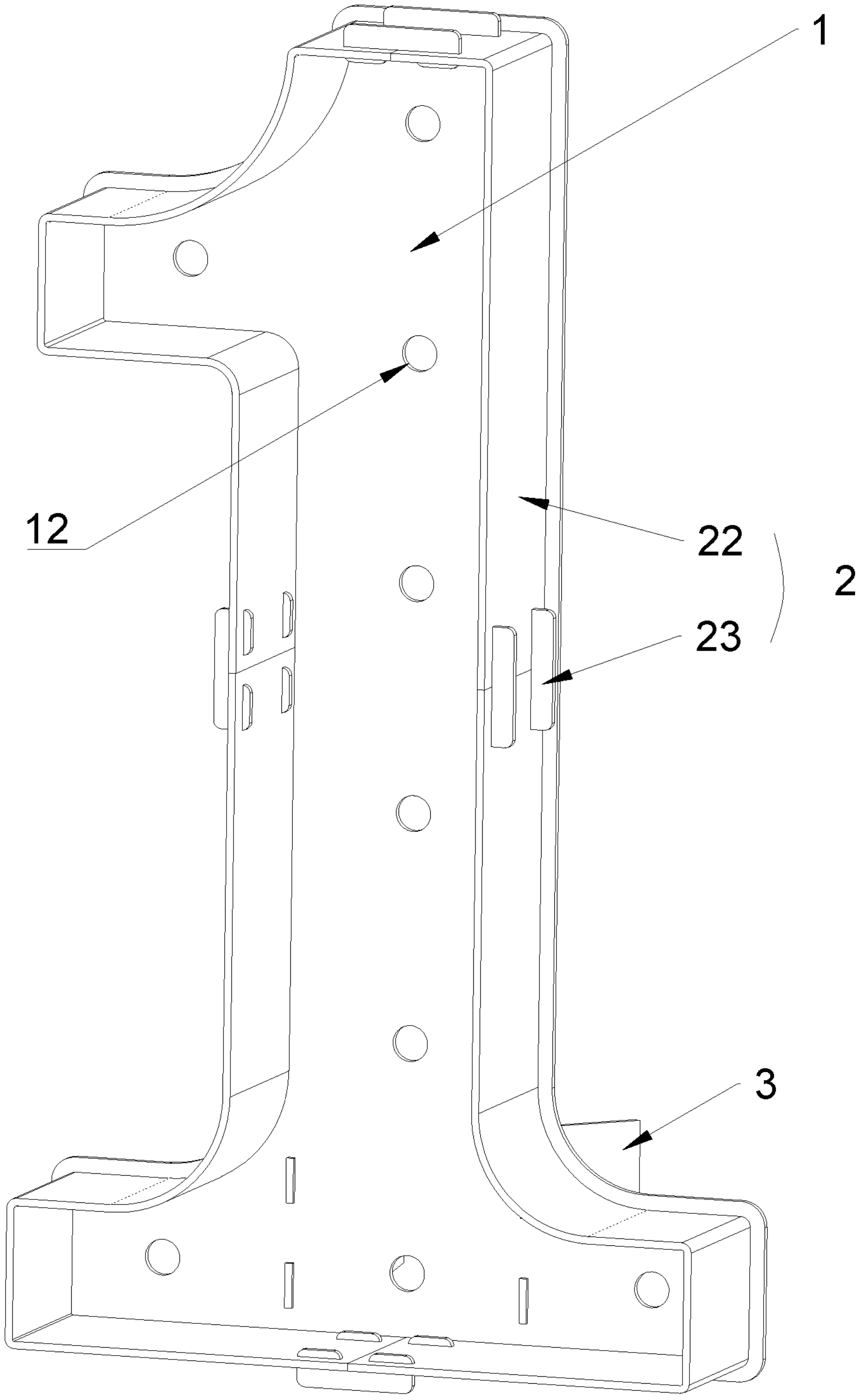
FIG. 1 is a schematic structural view of a number 1-shaped decorative panel provided by an embodiment disclosed in the present invention.

The present invention will be described below with reference to the drawings and embodiments in detail. The respective examples are provided by way of explanation of the present invention without limiting the present invention. Indeed, it will be apparent to a person skilled in the art that modifications and variations can be made in the present invention without departing from the scope or spirit of the invention. For example, features illustrated or described as being part of one embodiment may be used in another embodiment to yield yet another embodiment. Therefore, it is expected that the present invention includes such modifications and variations within the scope of the accompanying claims and their equivalent.

In the description of the present invention, orientation or position relationships indicated by terms such as "longitudinal", "lateral", "up", "down", "front", "rear", "left", "right", "vertical", "horizontal", "top", and "bottom" are based on orientation or position relationships shown in the accompanying drawings, which are only used to facilitate description of the present invention rather than requiring that the present invention must be constructed and operated in a specific orientation, and therefore cannot be construed as a limitation on the present invention. The terms "connecting", "connected" and "provided" used in the present invention should be understood broadly, for example, may be fixedly connected, and may also be detachably connected; may also be direct connections or indirect connections via intervening components; may also be wired connections or radio connections; and may also be wireless communication signal connections. A person of ordinary skill in the art would have been able to understand the specific meaning of the described terms according to specific situations.

One or more examples of the present invention are illustrated in the accompanying drawings. The detailed description uses numerals and letter markings to refer to features in the drawings. The similar or analogous markings in the drawings and descriptions have been used to refer to similar or analogous parts of the present invention. As used herein, the terms "first", "second", and "third", etc., are used interchangeably to distinguish one member from another, and are not intended to represent the location or importance of the individual members.

Figure 7:
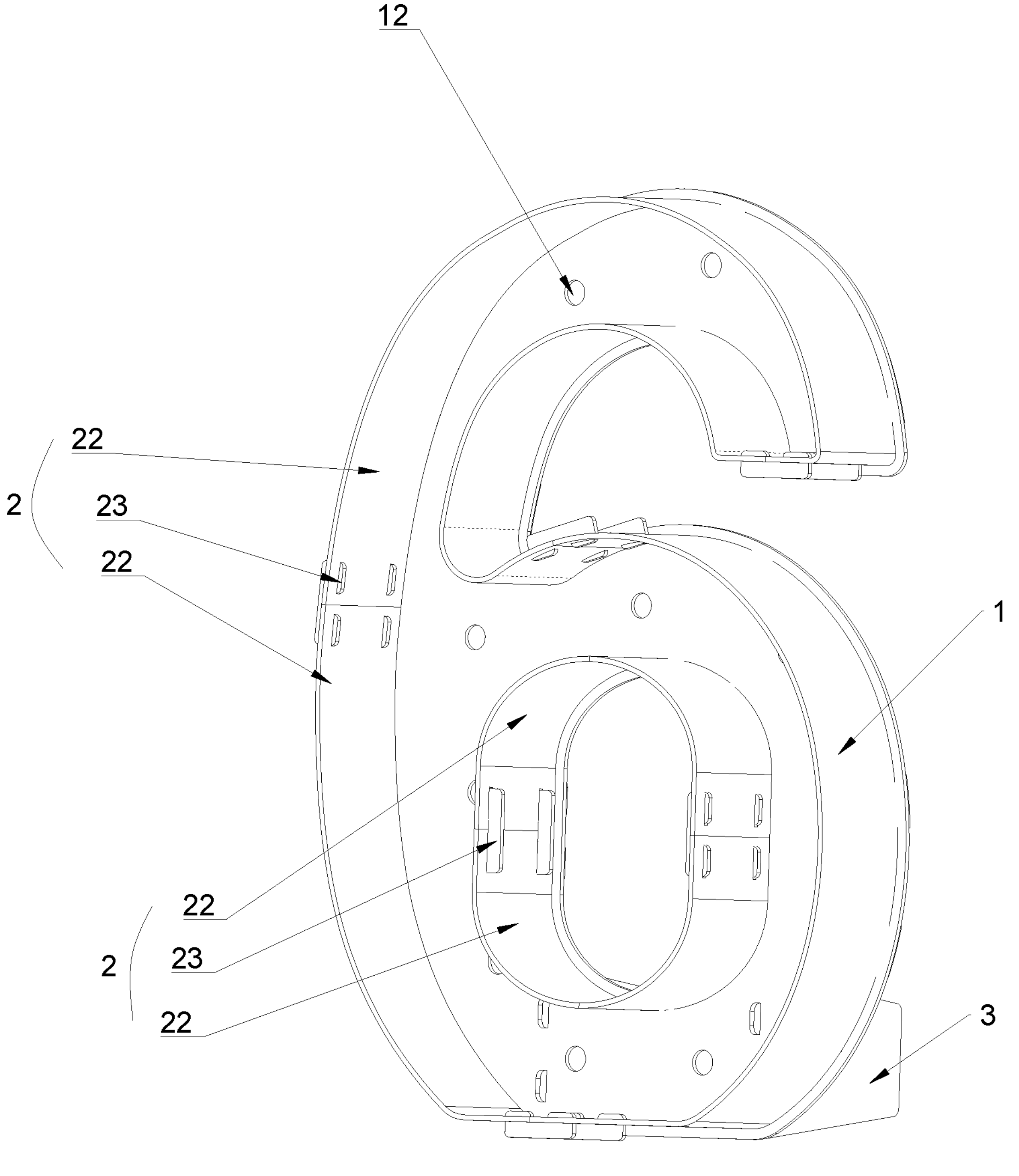
FIG. 7 is a schematic structural view of a number 6-shaped decorative panel provided by an embodiment disclosed in the present invention.

In order to solve the problems of high assembly difficulty, slow speed and uneven assembly quality existing in conventional letter and number-shaped decorative panels, this embodiment provides a letter and number-shaped decorative panel. Referring to FIGS. 1 and 7, which is the same as the prior art, the decorative panel is also composed of a base plate 1 and side plates 2. However, in this embodiment, the base plate 1 and the side plates 2 are specially designed, thereby greatly reducing the assembly difficulty between the base plate 1 and the side plate 2, and increasing the assembly speed.

The base plate 1 can be divided into two types according to the shape of z letter and number. One is a hollowed-out base plate and the other is a non-hollowed-out base plate. For 24 English letters, corresponding base plates for A, B, D, O, P, Q, R are hollowed-out base plates, and corresponding base plates for C, E, F, G, H, I, J, K, L, M, N, S, T, U, V, W, X, Y, Z are non-hollowed-out base plates. For 10 Arabic numerals, corresponding base plates for 0, 4, 6, 8, and 9 are hollowed-out base plates, and corresponding base plates for 1, 2, 3, 5, and 7 are non-hollowed-out base plates.

The decorative panel will be described below in two different forms of hollowed-out and non-hollowed-out base plates respectively.

Figure 2:
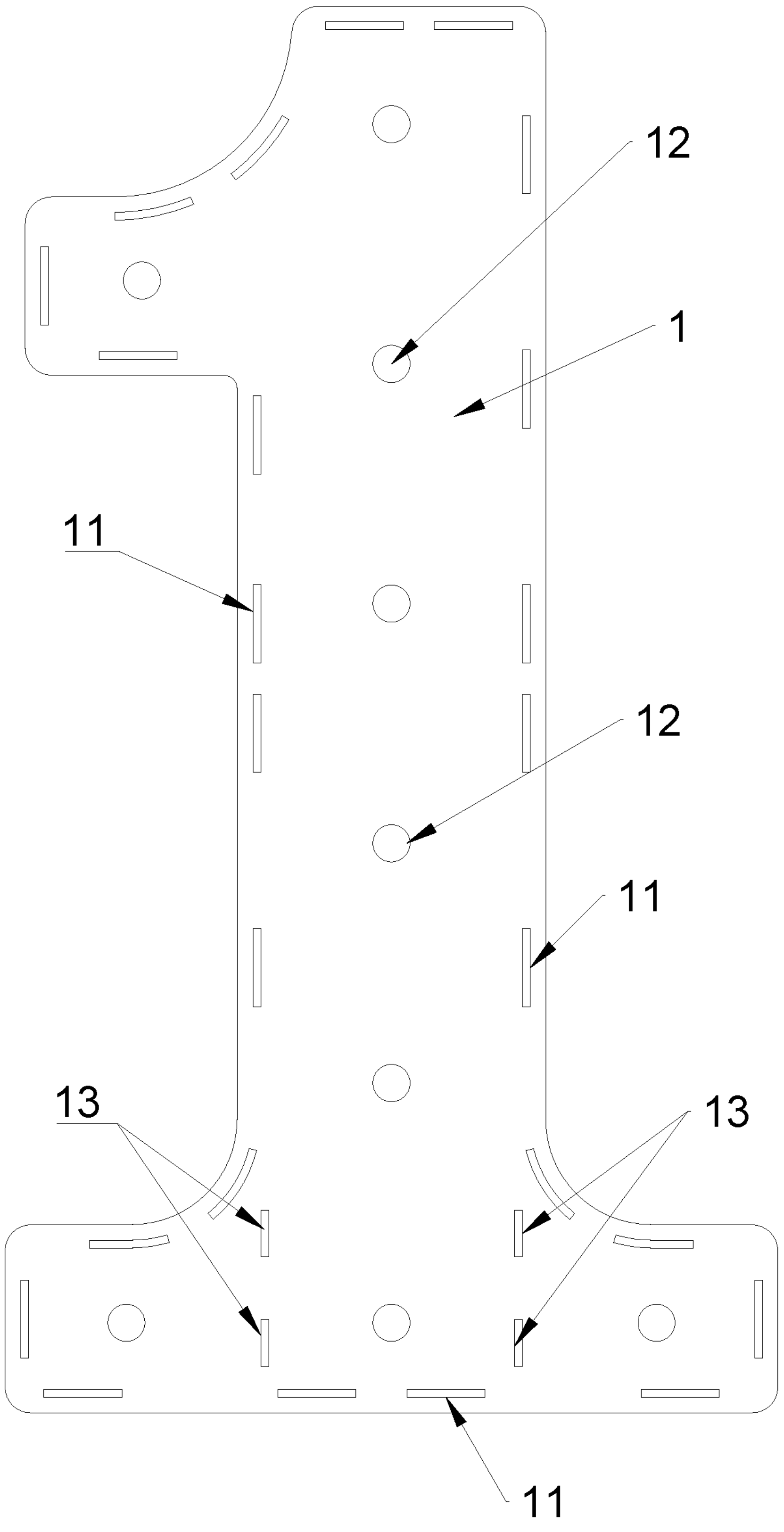
FIG. 2 is a schematic structural view of a base plate in a number 1-shaped decorative panel provided by an embodiment disclosed in the present invention.
Figure 3:
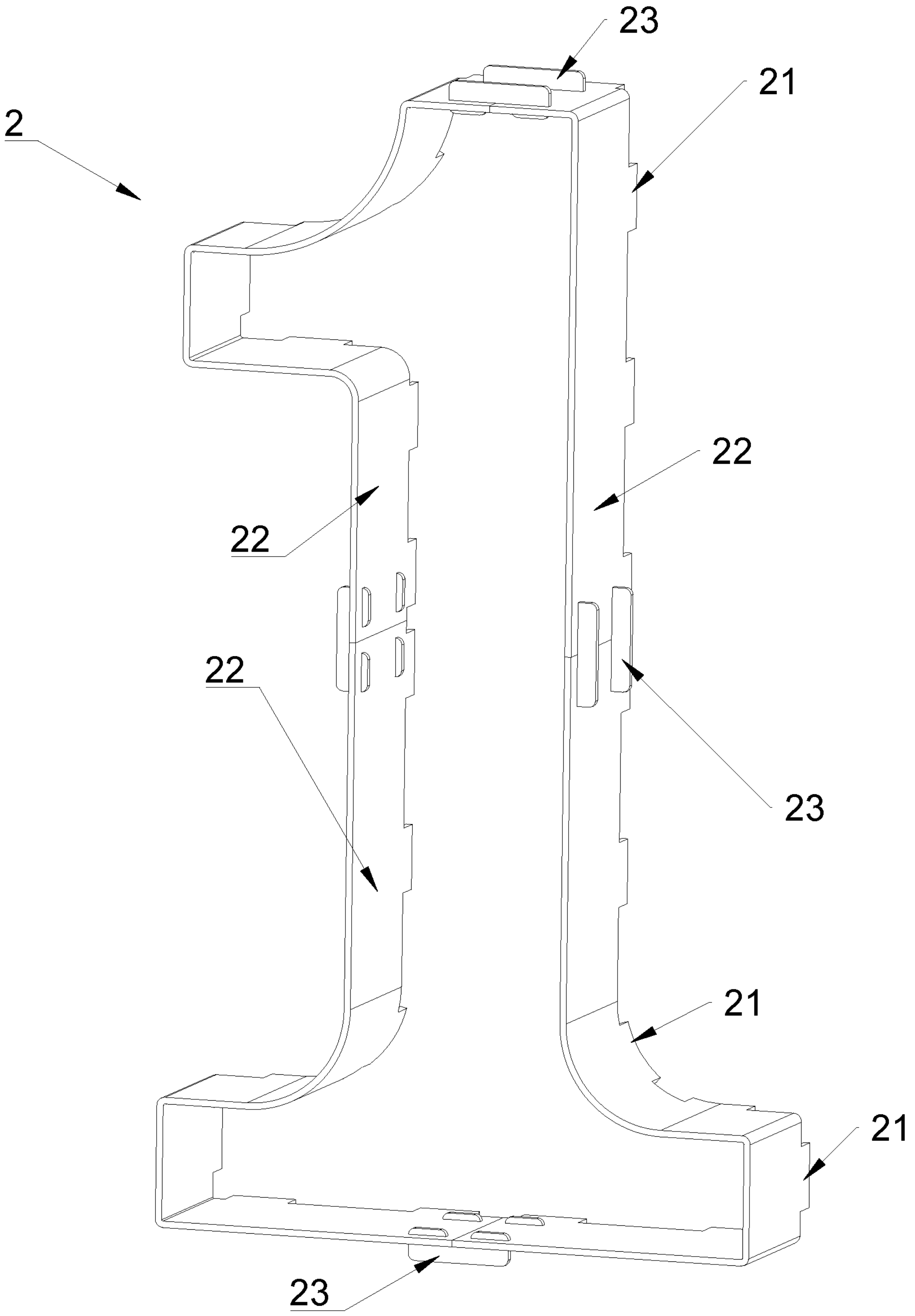
FIG. 3 is a schematic structural view of a side plate in a number 1-shaped decorative panel provided by an embodiment disclosed in the present invention.

Referring to FIG. 1, FIG. 1 is a number 1-shaped decorative panel, and the decorative panel is mainly composed of a base plate 1 and a side plate 2. Referring to FIG. 2, the shape of the base plate 1 is the same as that of the number 1, and belongs to a non-hollowed-out base plate; a plurality of first slots 11 are arranged at intervals along a periphery of an edge of the shape of the base plate on the base plate 1; and the side plate 2 is perpendicularly provided along the periphery of the edge of the shape of the base plate 1. Referring to FIG. 3, first insertion plates 21 in one-to-one correspondence with the first slots 11 in the base plate 1 are provided at a side of the side plate 2 close to the base plate 1; and the first insertion plates 21 are inserted into the corresponding first slots 11 to connect the side plate 2 to the base plate 1, so as to form a letter and number 1-shaped decorative cover having an opening on one side as shown in FIG. 1.

Figure 8:
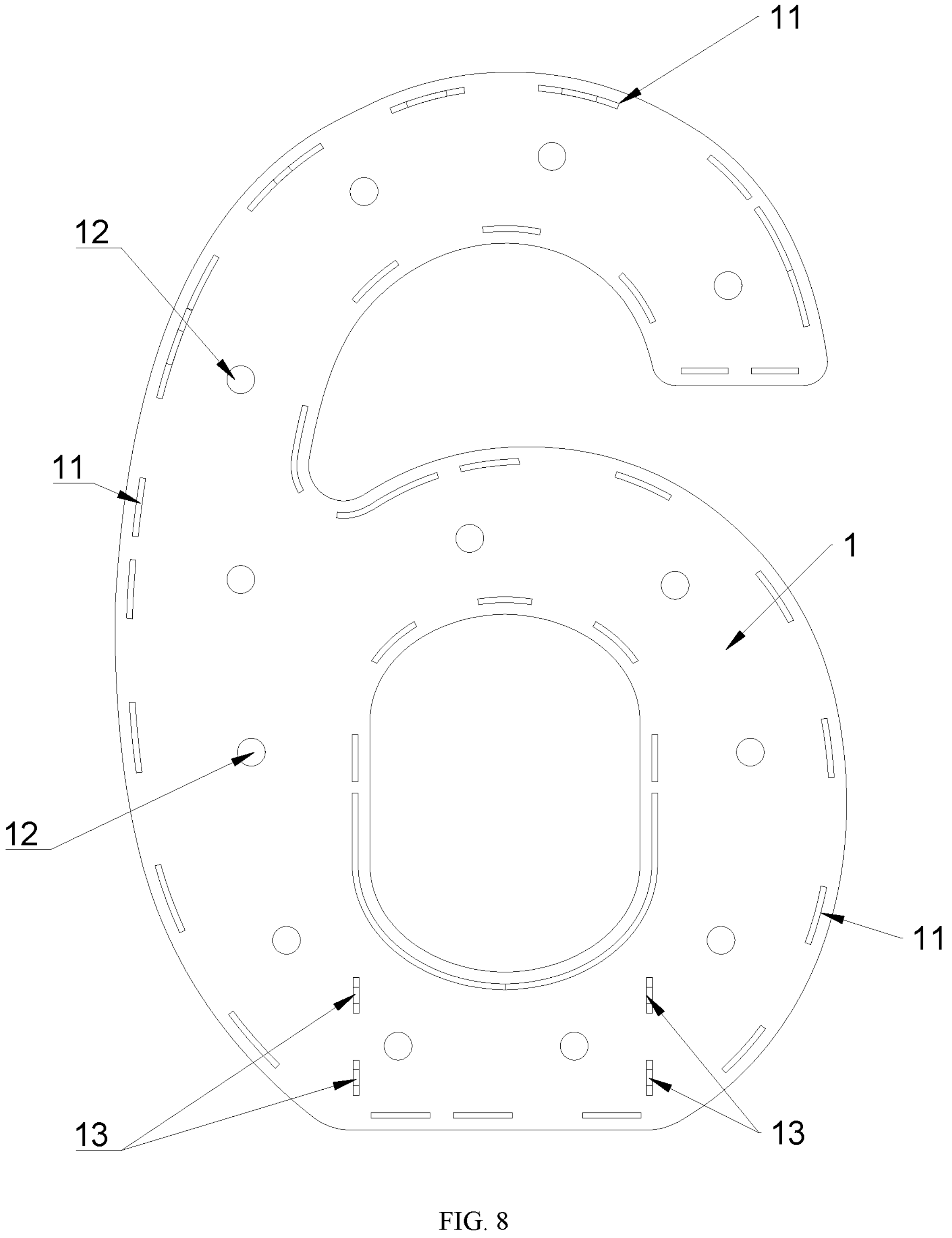
FIG. 8 is a schematic structural view of a base plate in a number 6-shaped decorative panel provided by an embodiment disclosed in the present invention.
Figure 9:
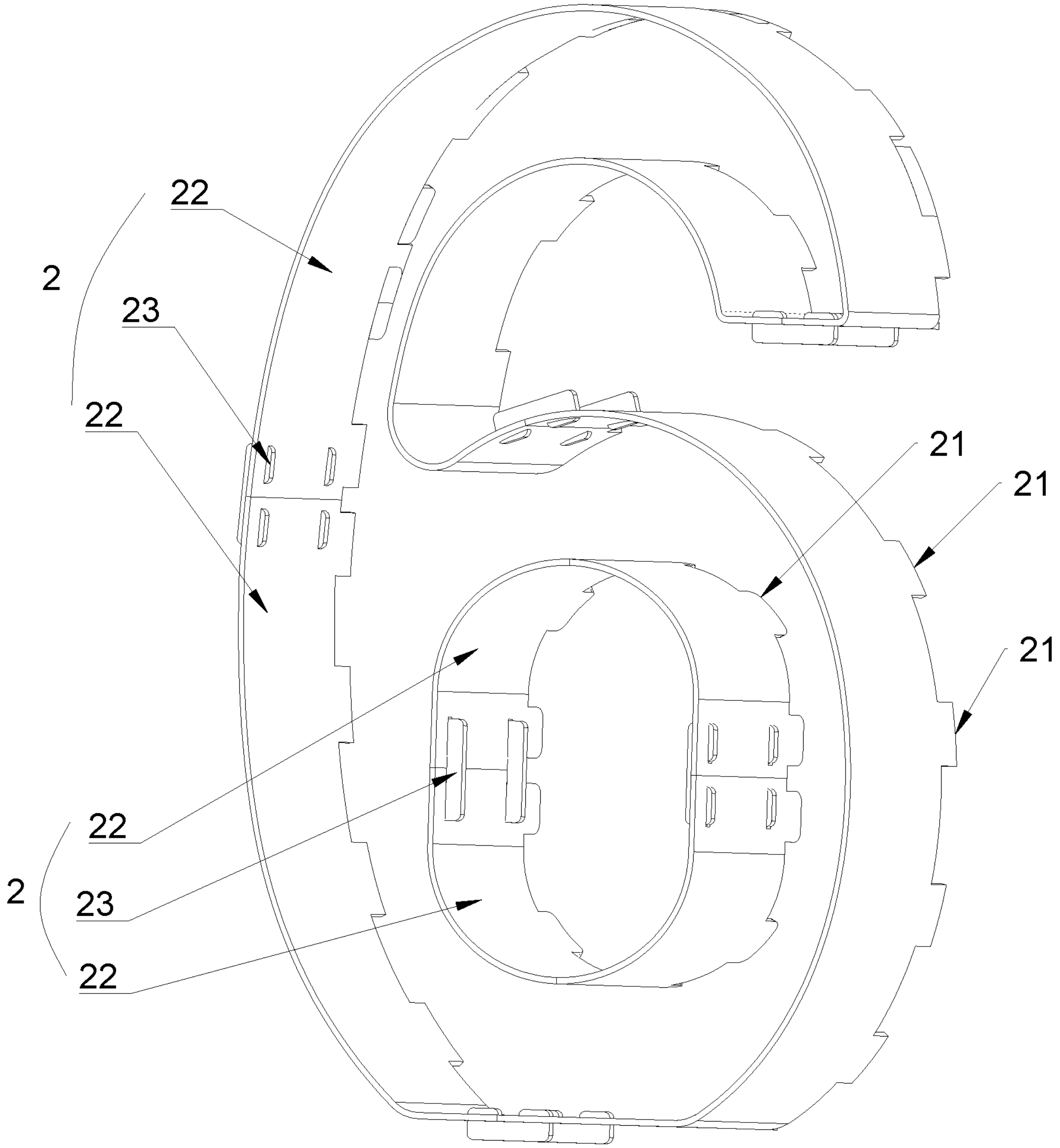
FIG. 9 is a schematic structural view of a side plate in a number 6-shaped decorative panel provided by an embodiment disclosed in the present invention.

Referring to FIG. 7, FIG. 7 is a number 6-shaped decorative panel, and the decorative panel is mainly composed of a base plate 1 and two side plates 2. Referring to FIG. 8, the shape of the base plate 1 is the same as that of the number 6, and belongs to a hollowed-out base plate; a plurality of first slots 11 are arranged at intervals along a periphery of an edge of the shape of the base plate on the base plate 1; the edge include an outer edge and an inner edge (an edge at the hollowed-out position); and one of the side plates 2 is perpendicularly provided along the outer edge of the shape of the base plate 1, and the other is perpendicularly provided along the inner edge of the shape of the base plate 1. Referring to FIG. 9, first insertion plates 21 corresponding to the first slots 11 in the base plate 1 in one-to-one correspondence are provided at a side of each of the side plates 2 close to the base plate 1; and the first insertion plates 21 are inserted into the corresponding first slots 11 to connect two side plates 2 to the base plate 1 respectively, so as to form a letter and number 6-shaped decorative cover having an opening on one side as shown in FIG. 7.

Figure 4:
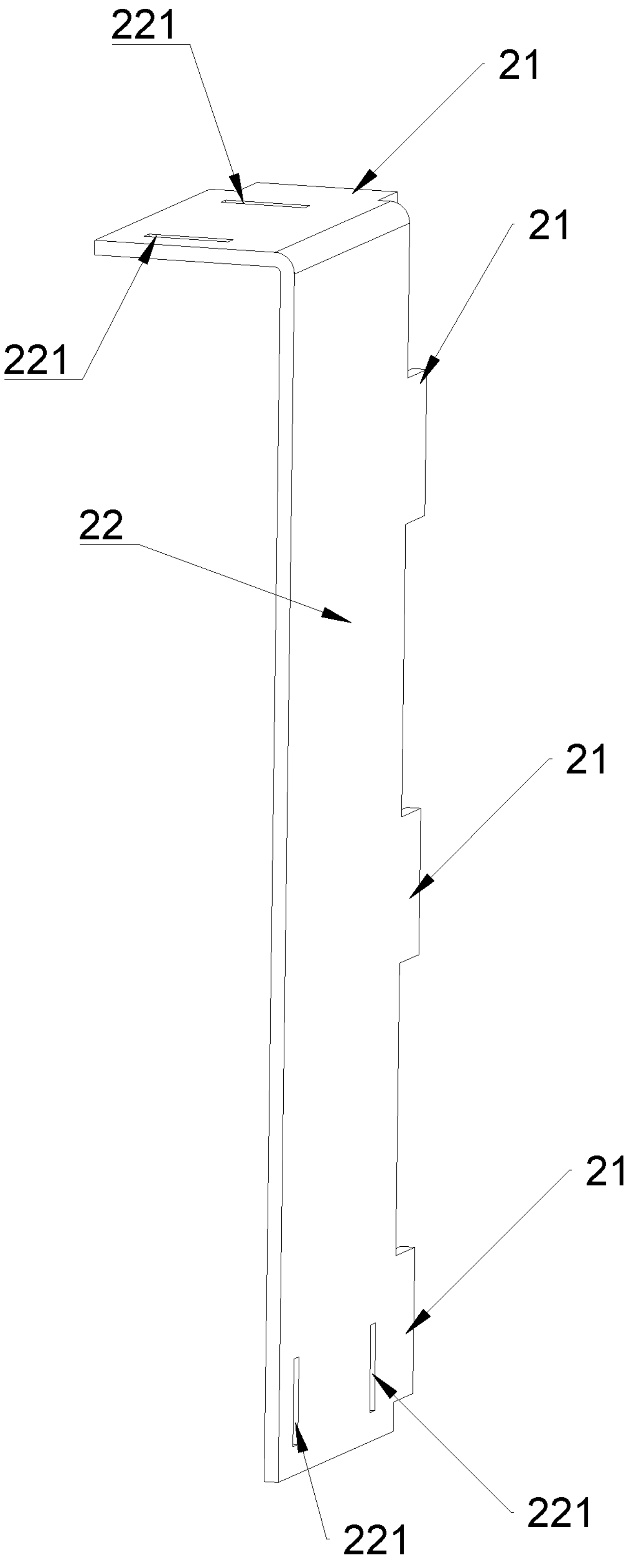
FIG. 4 is a schematic structural view of side plate units of a number 1-shaped decorative panel provided by an embodiment disclosed in the present invention.
Figure 5:
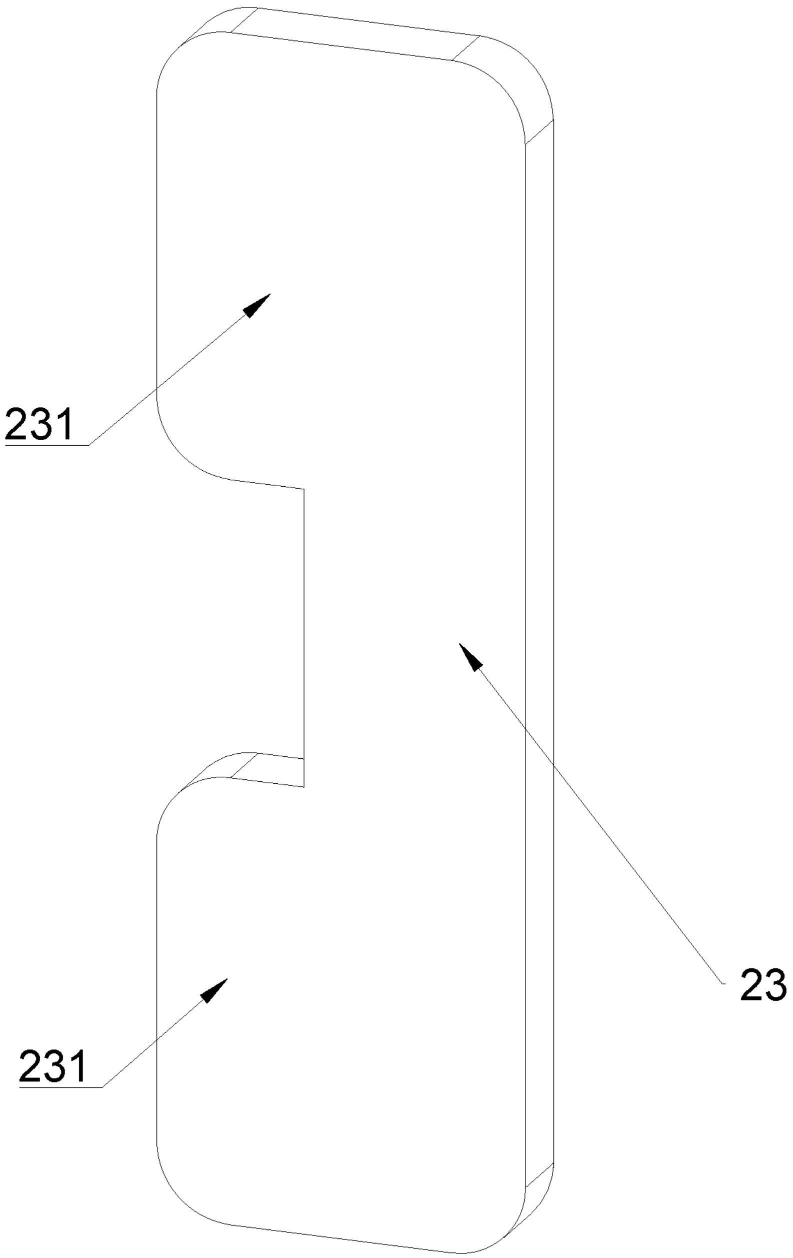
FIG. 5 is a schematic structural view of a connecting plate in a number 1-shaped decorative panel provided by an embodiment disclosed in the present invention.

The side plates 2 can be of an integrated structure. However, in order to facilitate processing and transportation, preferably, as shown in FIGS. 3 and 9, the side plates 2 are designed to be of a split structure, and is composed of a plurality of side plate units 22 and a plurality of connection plates 23; wherein the plurality of side plate units 22 are connected head to end in sequence, and the first insertion plates 21 correspondingly fitting with the first slots 11 in the base plate 1 are provided at one side of each of the side plate units 22 close to the base plate 1. Referring to FIG. 4, second slots 221 are provided at two ends of each of the side plate units 22. Referring to FIGS. 3 and 9, the connection plates 23 are provided at a head-to-tail connection of two adjacent side plate units 22. Referring to FIG. 5, second insertion plates 231 fitting with the second slots 221 are provided at two ends of a side wall of each of the connection plates 23, the second insertion plates 231 at two ends of each of the connection plates 23 are respectively inserted in the second slots 221 of the two adjacent side plate units 22 to connect the two adjacent side plate units 22.

In order to improve the stability of the connection plates 23 with respect to the connection between two adjacent side plate units 22, as an improvement of the technical solution, referring to FIGS. 3 and 9, two second slots 221 are provided at intervals along a height direction at an end of each of the side plate units 22, and the two adjacent side plate units 22 are connected by means of two connection plates 23.

Due to the fact that the above decorative panel mainly achieves the effect of letter or number decoration by mounting a light bulb therein, as shown in FIGS. 2 and 8, decorative light bulb mounting holes 12 are provided at intervals on the base plate 1 to facilitate the mounting and limiting of a decorative light bulb.

Figure 6:
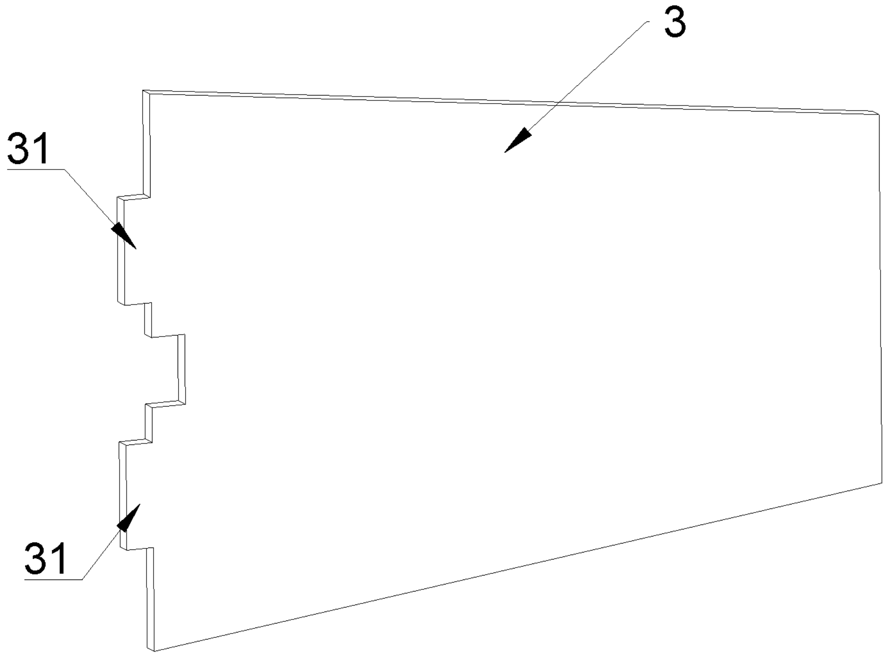
FIG. 6 is a schematic structural view of a support plate in a number 1-shaped decorative panel provided by an embodiment disclosed in the present invention.

The decorative panel in the above embodiment may not only be attached to a wall, but also be decorated by hanging, and can also be directly placed on a panel. In order to make the decorative panel more stable when placed, as an improvement of the technical solution, referring to FIGS. 1 and 7, a support plate 3 may be further provided in the decoration panel to assist in the stable placement of the decoration panel. In order to fit the mounting of the support plate 3, as an improvement of the technical solution, referring to FIGS. 2 and 8, third slots 13 are provided at a lower portion of the base plate 1. Referring to FIG. 6, third insertion plates 31 fitting with the third slots 13 are provided at an end of the support plate 3, and the third insertion plates 31 are inserted into the correspondingly fitted third slots 13 to connect the support plate 3 to the base plate 1. One end of the support plate 3 close to the base plate 1 has a higher height, and the other end has a lower height, thereby facilitating placement. In order to further improve stability, as an improvement of the technical solution, two support plates 3 are provided in each decoration panel, two third slots 13 are arranged at intervals in the transverse direction at the lower portion of the base plate 1, and the support plates 3 is in one-to-one correspondence with the third slots 13, the third insertion plates 31 on each of the support plates 3 are inserted into the corresponding third slots 13. As shown in FIG. 6, two fitting third slots 31 are provided on the support plates 3. Referring to FIG. 2, two fitting third slots 13 are correspondingly provided on the base plate 1. In actual use, one or more sets of fitting insertion plates and slots can be provided as needed.

Preferably, the first slots 11, the second slots 221, and the third slots 13 are long holes; and a groove is provided on an end of each of the first insertion plates 21, the second insertion plates 231, and the third insertion plates 31. After the first insertion plates 21 pass through the first slots 11, the second insertion plates 231 pass through the second slots 221, and the third insertion plates 31 pass through the third slots 13, rubber sleeves are sleeved outside the corresponding insertion plates to limit the position of the insertion plates, thereby improving the stability of the connection.

Other embodiments of the present invention will be readily apparent to a person skilled in the art from consideration of the description and practice of the invention disclosed herein. The present application is intended to cover any variations, uses, or adaptive changes of the present invention, which follow the general principles of the present invention and include common general knowledge or customary technical means in the art that are not disclosed in the present invention. The description and examples be considered as exemplary only, and the true scope and spirit of the present invention are indicated by the claims.

The above description is only the preferred embodiments of the present invention, and is not intended to limit the present invention. For a person skilled in the art, the present invention may have various modifications and variations. Any modifications, equivalent replacements, improvements and the like made within the spirit and principle of the present invention shall belong to the protection scope of the present invention.

What is claimed is:

1. A letter or number-shaped decorative panel, comprising: a base plate and a side plate;

wherein the base plate is in a shape of a letter or a number, and a plurality of first slots are arranged at intervals along a periphery of an edge of the shape of the base plate on the base plate;

the side plate is perpendicularly provided along the periphery of the edge of the shape of the base plate; first insertion plates in one-to-one correspondence with the first slots in the base plate are provided at a side of the side plate close to the base plate; and the first insertion plates are inserted into the corresponding first slots to connect the side plate to the base plate, so as to form a letter or number-shaped decorative cover having an opening on one side.

2. The letter or number-shaped decorative panel according to claim 1, wherein the base plate comprises a hollowed-out base plate or a non-hollowed-out base plate according to different shapes of the letter and the number;

when the base plate is a hollowed-out base plate, the number of the side plates is one more than the number of holes in the base plate; and when the base plate is a non-hollowed-out base plate, only one side plate is provided.

3. The letter or number-shaped decorative panel according to claim 1, wherein the side plate is of an integral type.

4. The letter or number-shaped decorative panel according to claim 1, wherein the side plate is of a split type, and comprises a plurality of side plate units and a plurality of connection plates;

the plurality of side plate units are connected head to end in sequence, the first insertion plates correspondingly fitting with the first slots in the base plate are provided at one side of each of the side plate units close to the base plate, and second slots are provided at two ends of each of the side plate units;

the connection plates are provided at a head-to-tail connection of two adjacent side plate units, second insertion plates fitting with the second slots are provided at two ends of a side wall of each of the connection plates, the second insertion plates at two ends of each of the connection plates are respectively inserted in the second slots of the two adjacent side plate units to connect the two adjacent side plate units.

5. The letter or number-shaped decorative panel according to claim 4, wherein two second slots are provided at intervals along a height direction at an end of each of the side plate units, and the two adjacent side plate units are connected by means of two connection plates.

6. The letter or number-shaped decorative panel according to claim 1, wherein decorative light bulb mounting holes are provided at intervals on the base plate.

7. The letter or number-shaped decorative panel according to claim 1, further comprising: support plates, wherein third slots are provided at a lower portion of the base plate;

third insertion plates fitting with the third slots are provided at an end of each of the support plates, and the third insertion plates are inserted into the correspondingly fitted third slots to connect each of the support plates and the base plate.

8. The letter or number-shaped decorative panel according to claim 7, wherein two support plates are provided;

two third slots are arranged at intervals in a transverse direction at the lower portion of the base plate;

the support plates are in one-to-one correspondence with the third slots, and the third insertion plates on each of the support plates are inserted into the correspondingly fitted third slots.

9. The letter or number-shaped decorative panel according to claim 4, wherein the first slots, the second slots and the third slots are long holes.

* * * * *